United States Patent
Lee et al.

(10) Patent No.: US 10,977,988 B2
(45) Date of Patent: Apr. 13, 2021

(54) DISPLAY DEVICE INCLUDING POWER DELIVERY NETWORK CONTROLLER AND DISPLAY POWER MANAGEMENT METHOD USING THE SAME

(71) Applicant: ELECTRONICS AND TELECOMMUNICATIONS RESEARCH INSTITUTE, Daejeon (KR)

(72) Inventors: Woo Joo Lee, Daejeon (KR); Suk Ho Lee, Daejeon (KR); Kyung Jin Byun, Daejeon (KR); Nak Woong Eum, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/838,629

(22) Filed: Apr. 2, 2020

(65) Prior Publication Data
US 2020/0234635 A1    Jul. 23, 2020

Related U.S. Application Data

(62) Division of application No. 15/766,464, filed as application No. PCT/KR2017/000906 on Jan. 25, 2017, now Pat. No. 10,650,732.

(30) Foreign Application Priority Data

Mar. 3, 2016    (KR) .......................... 10-2016-0025837

(51) Int. Cl.
*G09G 3/3208*    (2016.01)
*G09G 3/20*    (2006.01)
(Continued)

(52) U.S. Cl.
CPC ......... *G09G 3/3208* (2013.01); *G06F 1/3218* (2013.01); *G06F 3/1446* (2013.01);
(Continued)

(58) Field of Classification Search
CPC ...... G09G 3/20; G09G 3/2092; G09G 3/2096; G09G 3/30; G09G 3/3208; G09G 3/3291;
(Continued)

(56) References Cited

U.S. PATENT DOCUMENTS 6,747,617 B1 *   6/2004   Kawashima ......... G09G 3/3283
                                                    315/169.1
7,768,492 B2    8/2010   Sakamaki et al.
(Continued)

FOREIGN PATENT DOCUMENTS

CN    101998733 A    3/2011
CN    103177688 A    6/2013
(Continued)

OTHER PUBLICATIONS

"Content-centric Display Energy Management for Mobile Devices", Kim et al., 51st ACM/EDAC/IEEE Design Automation Conference, published Jun. 2014. (Year: 2014).
(Continued)

*Primary Examiner* — Keith L Crawley
(74) *Attorney, Agent, or Firm* — Rabin & Berdo, P.C.

(57) ABSTRACT

Provided is a display device including a display panel, a power delivery network (PDN), an image controller, and a PDN controller. The display panel may include a plurality of sub-panels. The PDN may be controlled by a control signal, respectively deliver voltages determined by the control signal to the plurality of sub-panels, and generate state information for determining the control signal. The image controller may receive to store frame image data, determine a number of frames to be integrated according to a window
(Continued)

size, and integrate the frame image data of frames in the determined number into one image to generate integrated image data. The PDN controller may generate the control signal and a size adjusting signal based on the state information and the integrated image data, provide the generated control signal to the PDN, and may provide the generated size adjusting signal to the image controller. The size adjusting signal may adjust the window size.

9 Claims, 12 Drawing Sheets

(51) Int. Cl.
    *H05B 45/37*     (2020.01)
    *H05B 45/00*     (2020.01)
    *G06F 1/3218*     (2019.01)
    *G06F 3/14*     (2006.01)
    *G06F 1/3296*     (2019.01)

(52) U.S. Cl.
    CPC .............. *G09G 3/20* (2013.01); *H05B 45/37* (2020.01); *H05B 45/60* (2020.01); *G06F 1/3296* (2013.01); *G09G 2330/021* (2013.01); *G09G 2330/028* (2013.01); *G09G 2360/04* (2013.01); *G09G 2360/08* (2013.01)

(58) Field of Classification Search
    CPC ................. G09G 3/3696; G09G 5/003; G09G 2300/026; G09G 2310/0289; G09G 2320/0223; G09G 2320/103; G09G 2330/02; G09G 2330/021; G09G 2330/025; G09G 2330/028; G09G 2360/04; G09G 2360/08; G06F 1/3218; G06F 1/3234; G06F 1/3265; G06F 1/3296; G06F 1/32; G06F 1/3203; G06F 3/1423; G06F 3/1446; H05B 33/08; G05B 45/37; G05B 45/3725; G05B 45/60
    See application file for complete search history.

(56) References Cited

U.S. PATENT DOCUMENTS

| | | | |
|---|---|---|---|
| 8,035,315 B2 | 10/2011 | Zhao et al. | |
| 8,474,084 B2 | 7/2013 | Pak et al. | |
| 8,736,180 B2 | 5/2014 | Tsai et al. | |
| 8,786,204 B2 | 7/2014 | Park et al. | |
| 9,134,825 B2 | 9/2015 | Chaji | |
| 9,136,754 B2 | 9/2015 | Ahn et al. | |
| 9,934,721 B2 | 4/2018 | An et al. | |
| 2005/0156849 A1* | 7/2005 | Sun ..................... | G09G 3/3685 345/96 |
| 2007/0008297 A1 | 1/2007 | Bassetti | |
| 2009/0146931 A1 | 6/2009 | Kharrati et al. | |
| 2014/0188571 A1 | 7/2014 | Han et al. | |
| 2014/0354624 A1 | 12/2014 | Chaji | |
| 2015/0015589 A1* | 1/2015 | Chung ................. | G06T 1/20 345/501 |
| 2016/0134865 A1 | 5/2016 | Amer et al. | |
| 2017/0084246 A1* | 3/2017 | Joshi ..................... | G09G 5/00 |
| 2017/0347150 A1 | 11/2017 | Lee et al. | |

FOREIGN PATENT DOCUMENTS

| | | |
|---|---|---|
| CN | 103187877 A | 7/2013 |
| CN | 105096881 A | 11/2015 |
| JP | 2005-326754 A | 11/2005 |
| JP | 2013140361 A | 7/2013 |
| KR | 10-2011-0095593 A | 8/2011 |
| KR | 10-2014-0000482 A | 1/2014 |
| KR | 20150106031 A | 9/2015 |

OTHER PUBLICATIONS

"Dynamic Driver Supply Voltage Scaling for Organic Light Emitting Diode Displays", Shin et al., IEEE Transactions on Computer-Aided Design of Integrated Circuits and Systems, vol. 32, Issue 7, pp. 1017-1030, published Jun. 2013. (Year: 2013).

"Fine-grained dynamic voltage scaling on OLED display", Chen et al., 17th Asia and South Pacific Design Automation Conference, published Feb. 2012. (Year: 2012).

"Online OLED Dynamic Voltage Scaling for Video Streaming Applications on Mobile Devices", Zhao et al., 2013 International Conference on Hardware/Software Codesign and System Synthesis, published Oct. 2013. (Year: 2013).

"Quality-retaining OLED dynamic voltage scaling for video streaming applications on mobile devices", Chen et al., Proceedings of the 49th Annual Design Automation Conference, pp. 1000-1005, published Jun. 2012. (Year: 2012).

Woojoo Lee et al., "Design and Optimization of a Reconfigurable Power Delivery Network for Large-Area, DVS-Enabled OLED Displays", Low Power Electronics and Design (ISLPED), 2015 IEEE/ACM International Symposium on Jul. 22-24, 2015, pp. 1-6.

\* cited by examiner

DISPLAY DEVICE INCLUDING POWER DELIVERY NETWORK CONTROLLER AND DISPLAY POWER MANAGEMENT METHOD USING THE SAME

CROSS-REFERENCE TO RELATED APPLICATIONS

The present application is a Divisional Application of co-pending U.S. application Ser. No. 15/766,464, filed on Apr. 6, 2018, which was a National Stage application of PCT/KR2017/000906, filed on Jan. 25, 2017, and claims priority under 35 U.S.C. § 119 of Korean Patent Application No. 10-2016-0025837, filed on Mar. 3, 2016, the entire contents of which are hereby incorporated by reference.

TECHNICAL FIELD

The present invention disclosed herein relates to a display device and more particularly, to a display device including a power delivery network (PDN) controller and a display power management method using the same.

BACKGROUND ART

An organic light emitting diode (OLED) display is one of next generation's promising display devices. The OLED display is steadily growing in a display market. The OLED display is mounted in a mobile device such as a smartphone or an electronic device such as a TV.

On the other hand, in the OLED display, as the size of a panel becomes larger, power consumption of the OLED display increases. A mobile device is sensitive to such power consumption. In addition, as a display panel mounted in an electronic device such as a TV becomes larger, power consumption thereof becomes increased. Accordingly, power consumption of the OLED display becomes an important issue in mass production of an OLED display system. Accordingly, researches in various fields are performed for developing low power OLED display systems.

DISCLOSURE OF THE INVENTION

Technical Problem

The present invention provides a display device including a power delivery network (PDN) controller for controlling a reconfigurable PDN and a display power management method using the same.

Technical Solution

An embodiment of the present invention provides a display device may include a display panel, a power delivery network (PDN), an image controller, and a PDN controller. The display panel may include a plurality of sub-panels. The PDN may be controlled by a control signal, respectively deliver voltages determined by the control signal to the plurality of sub-panels, and generate state information for determining the control signal. The image controller may receive to store frame image data, determine a number of frames to be integrated according to a window size, and integrate the frame image data of frames in the determined number into one image to generate integrated image data. The PDN controller may generate the control signal and a size adjusting signal based on the state information and the integrated image data, provide the generated control signal to the PDN, and may provide the generated size adjusting signal to the image controller. The size adjusting signal may adjust the window size.

In an embodiment of the present invention, a power management method using a display device, which includes a display panel including a plurality of sub-panels, a PDN including a switch network and a plurality of DC-DC converters, an image controller, and a PDN controller, may include a reconfiguration information generating operation, an update and whether to re-execute determining operation, an updating and re-executing operation, and a PDN reconfiguring operation. The reconfiguration information generating operation may generate, by the PDN controller, reconfiguration information of the PDN for frames that configure a next window on a basis of an existing window size and existing state information about the PDN. The update and whether to re-execute determining operation may determine, by the PDN controller, whether to update the window size and whether to re-execute the reconfiguration information generating operation on the basis of the generated reconfiguration information. The updating and re-executing operation may update, by the image controller and the PDN controller, the window size and re-executing the reconfiguration information generating operation according to a result of the update and whether to re-execute determining operation. The PDN reconfiguring operation may reconfigure, by the PDN, the PDN on the basis of the generated reconfiguration information.

Advantageous Effects

According to embodiments of the present invention, the display device and a method for managing display power can reduce a production cost using the smaller number of converters than the number of sub-panels and can reduce power consumption. In addition, the display device and method for managing display power can improve operation efficiencies of converters.

BRIEF DESCRIPTION OF THE DRAWINGS

Embodiments of the present invention are illustrated as exemplary, but not limited thereto, and like reference numerals refer to like elements throughout. In the drawings.

MODE FOR CARRYING OUT THE INVENTION

Figure 1:
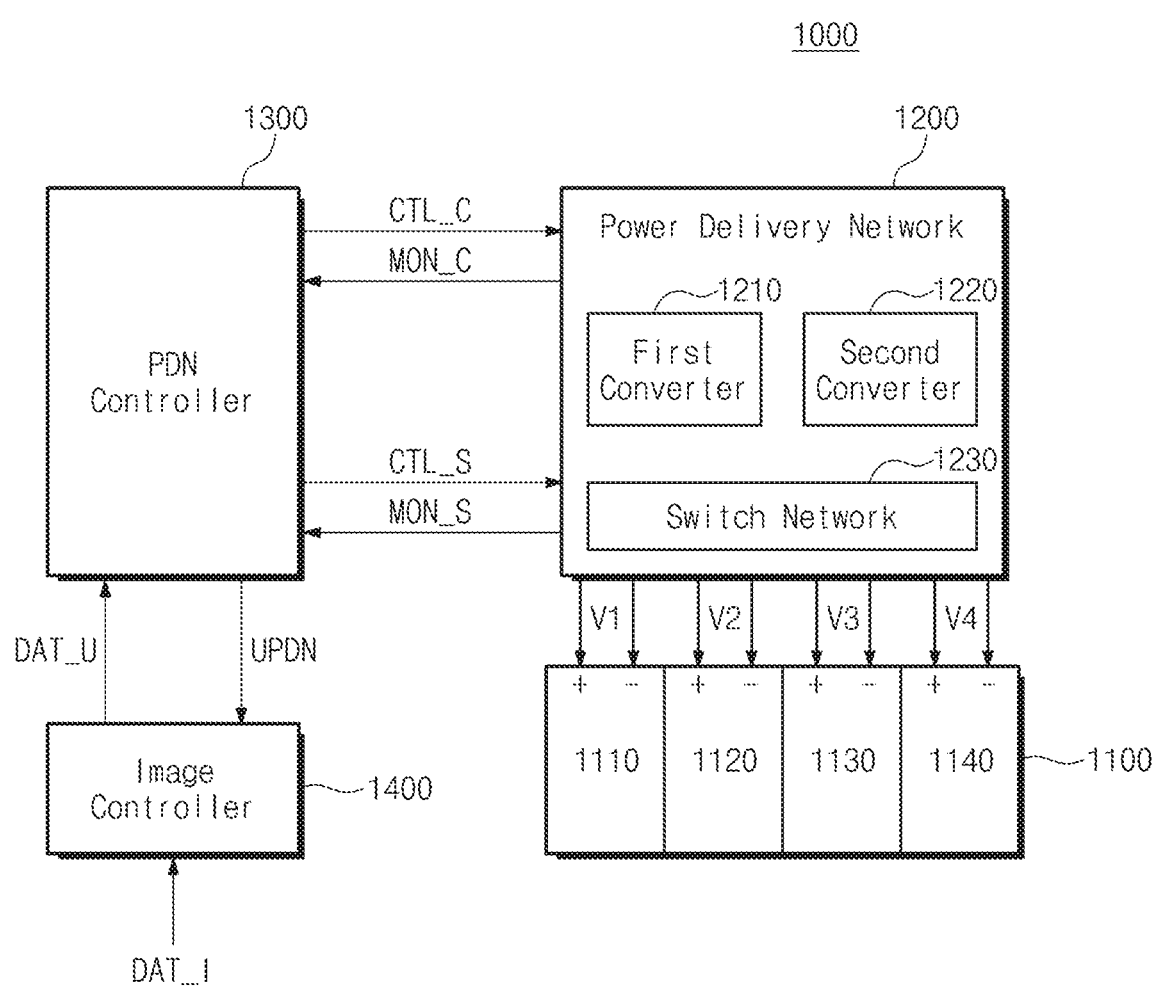
FIG. 1 is a block diagram of a display device according to an embodiment of the present invention.

It should be understood that both the foregoing general description and a following detailed description are merely illustrative, and it should be construed that supplementary descriptions for claimed inventions be provided. Reference symbols are represented in detail in preferred embodiments of the present invention, of which examples are denoted in the accompanying drawings. In any possible case, like reference numerals refer to like or similar elements throughout the drawings.

Hereinafter, a display device will be used as an example for explaining the feature and function of the present invention. However, those skilled in the art may easily understand other advantages and performance of the present invention according to contents described herein. The present invention may be implemented or applied through other embodiments. In addition, the detailed description may be modified or altered, not deviating far from the scope, the technical idea, and other objects of the present invention.

FIG. 1 is a block diagram of a display device according to an embodiment of the present invention. Referring to FIG. 1, a display device 1000 may include a display panel 1100, a power delivery network (PDN) 1200, a PDN controller 1300, and an image controller 1400.

The display panel 1100 may include a plurality of sub-panels 1110 to 1140. The plurality of sub-panels 1110 to 1140 respectively receive supply voltages V1 to V4 from the PDN 1200. The number of sub-panels 1110 to 1140 is not limited to that illustrated in FIG. 1. This will be explained with reference to FIG. 11. For example, the display panel 1100 may be an organic light emitting diode (OLED) display panel.

The reason why the display panel 1100 is divided into the plurality of sub-panels 1110 to 1140 is for reducing power consumption of the display panel 1100. The display panel 1100 may include a plurality of pixels. The plurality of pixels adjust brightness by adjusting a supplied current amount. Accordingly, the current amount provided to the pixels is variable. On the other hand, a voltage supplied to the pixels has a fixed value. For example, this voltage value may be 15 V. The fixed voltage value is set for a case where at least one pixel is lighted most brightly, namely, a case where a largest current amount is supplied.

However, when one frame is displayed, remaining pixels do not mostly request for the brightness of light to be a maximum value. In other words, the remaining pixels may receive a requested current amount, even though a voltage lower than a maximum voltage value is supplied. When a level of the supplied voltage becomes lower, power consumption of the display panel 1100 may be lowered. The display panel 1100 of FIG. 1 is configured with the plurality of sub-panels 1110 to 1140. The plurality of sub-panels 1110 to 1140 respectively receive the supply voltages V1 to V4. Accordingly, the display panel 1100 including the plurality of sub-panels 1110 to 1140 may reduce power consumption than a case where the display panel 1100 is driven by one voltage.

The PDN 1200 may include first and second converters 1210 and 1220 and a switch network 1230. The PDN 1200 is connected to the display panel 1100 to provide the supply voltages V1 to V4. The PDN 1200 is connected to the PDN controller 1300. The PDN 1200 provides a convert monitoring signal MON_C and a switch monitoring signal MON_S to the PDN controller 1300. In addition, the PDN 1200 receives a converter control signal CTL_C and a switch control signal CTL_S from the PDN controller 1300 to reconfigure connections of switch network 1230 and voltages of the first and second converters 1210 and 1220.

Each of the first and second converters 1210 and 1220 may supply a voltage to two or more sub-panels 1110 to 1140. The number of the first and second converters 1210 and 1220 may be smaller than the number of sub-panels 1110 to 1140, and is not limited to that illustrated in FIG. 1. This will be explained with reference to FIG. 11. For example, the first and second converters 1210 and 1220 may be DC-DC converters. Typically, an operation efficiency of a DC-DC converter increases, as a driving current amount becomes larger. According to an embodiment of the present invention, when one DC-DC converter supplies voltages and currents to the plurality of sub-panels, the operation efficiency of the DC-DC converter may increase.

The switch network 1230 connects the first and second converters 1210 and 1220 with the plurality of sub-panels 1110 to 1140. The detailed configuration and operation of the switch network 1230 will be described with reference to FIGS. 5 and 6.

The PDN controller 1300 is connected with the PDN 1200 and the image controller 1400. The PDN controller 1300 receives the converter monitoring signal MON_C and the switch monitoring signal MON_S from the PDN 1200. The PDN controller 1300 receives integrated image data DAT_U from the image controller 1400. The PDN controller 1300 generates reconfiguration information for the PDN 1200 and a size adjusting signal UPDN based on the received information MON_C, MON_S, and DAT_U. The reconfiguration information may include the converter control signal CTL_C and the switch control signal CTL_S. The above described signals CTL_C, CTL_S, MON_S, DAT_U, and UPDN will be explained with reference to FIG. 2.

The image controller 1400 is connected to the PDN controller 1300. The image controller 1400 may receive frame image data DAT_I. The image controller 1400 integrates frame image data of frames determined by a window size into one image to generate the integrated image data DAT_U. The image controller 1400 receives the size adjusting signal UPDN from the PDN controller 1300 to adjust the window size. The frame image data DAT_I is image data for one frame. The frame is a sheet of a still image displayed on a screen. In other words, a video is configured with a plurality of frames. In the present application, the window size is defined as the number of frames to be processed by the PDN controller 1300. In other words, the window size is the number of frames used for generating the reconfiguration information.

In FIG. 1, only the configuration of the display device 1000, which supplies voltages and currents to the display panel 1100, is illustrated. Although not illustrated, a configuration of a display driver IC (DDI) for supplying image data to be displayed on the display panel may be further included.

Figure 2:
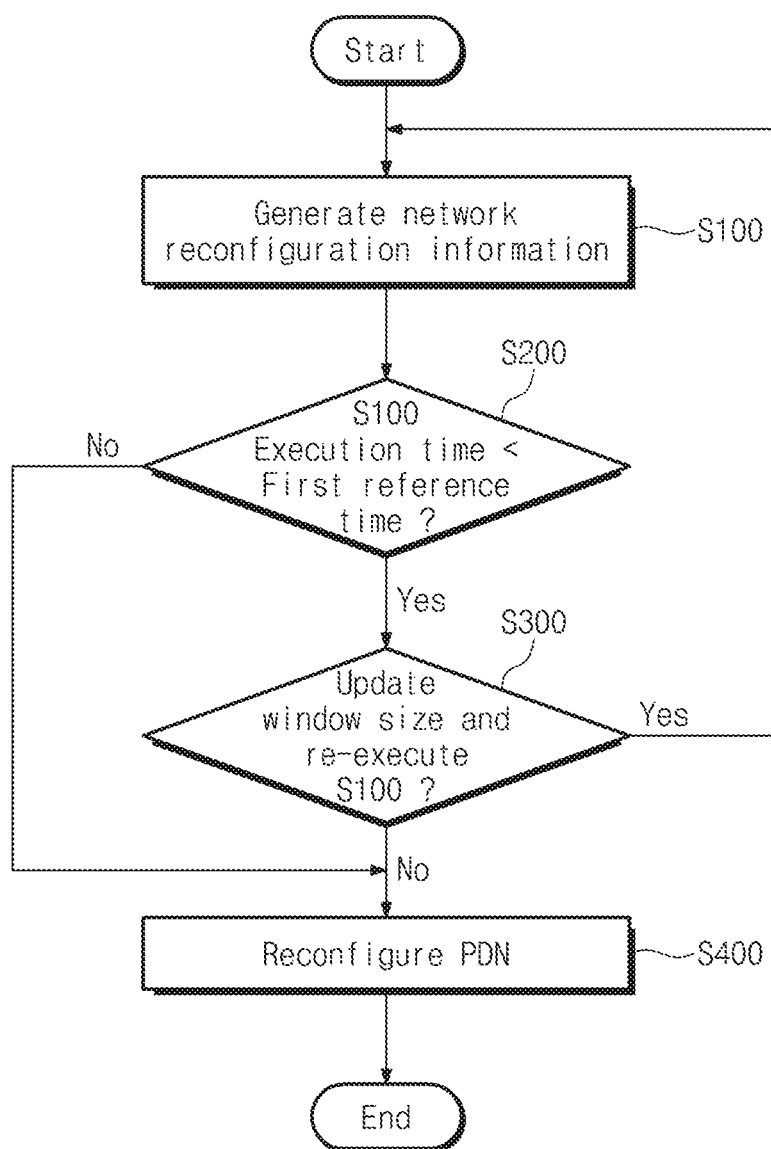
FIG. 2 is a flowchart illustrating an operation of the display device illustrated in FIG. 1.

FIG. 2 is a flowchart illustrating an operation of the display device illustrated in FIG. 1. The flowchart of FIG. 2 will be explained with reference to FIG. 1. Referring to FIG. 2, the display device 1000 may generate the reconfiguration information of the PDN 1200 for reducing power consumption of the display panel 1100.

In operation S100, the PDN controller 1300 generates the reconfiguration information for the PDN 1200 for a predetermined window. An execution time of operation S100 corresponds to a time period C of FIG. 3 to be described later. A detailed operation will be explained with reference to FIGS. 7 and 8.

In operation S200, it is determined whether the execution time in operation S100 is shorter than a first reference time. The reason why is as the following. The display device 1000 determines whether to re-execute operation S100 in subsequent operations. However, when the execution time of operation S100 exceeds a certain time, a time to re-execute operation S100 becomes insufficient. Accordingly, when the execution time of operation S100 exceeds the certain time, whether to re-execute operation S100 is not determined. For example, the first reference time may be half the time when a window determined by a previous process is currently being displayed. This corresponds to a half of a time period A to be described later in FIG. 3.

When the execution time of operation S100 is longer than the first reference time (No direction), the PDN 1200 is reconfigured by the reconfiguration information generated in operation S100 (operation S400). On the other hand, when the execution time of operation S100 is shorter than the first reference time (Yes direction), the process of PDN controller 1300 proceeds to operation S300.

In operation S300, the PDN controller 1300 determines whether to update the window size and to re-execute operation S100. The PDN controller 1300 determines whether to re-execute operation S100 by considering a data amount to be processed, when frame image data of frames included in an existing window size is processed, and an execution time of operation S300. When the update and re-execution are performed (Yes direction), the PDN controller 1300 re-executes operation S100 for the updated window size (operation S100). When the update and re-execution are not performed (No direction), the process proceeds to operation S400. A detailed operation will be explained with reference to FIGS. 7 and 9. Reconfiguration information for a next window is generated by the above-described operations S100 to S300. The reconfiguration information is reconfiguration information for the PDN 1200 in order to reduce power consumption of the display panel 1100.

In operation S400, the PDN 1200 is reconfigured by receiving the reconfiguration information. The PDN 1200 generates voltages of the first and second converters 1210 and 1220 based on the reconfiguration information. Then, the switch network 1230 connects the first and second converters 1210 and 1220 with the plurality of sub-panels 1110 to 1140 based on the reconfiguration information. Consequently, the PDN 1200 supplies the supply voltages V1 to V4 to the plurality of sub-panels 1110 to 1140 respectively. Then, the display panel 1100 operates by the received voltages to display frames included in a next window.

Figure 3:
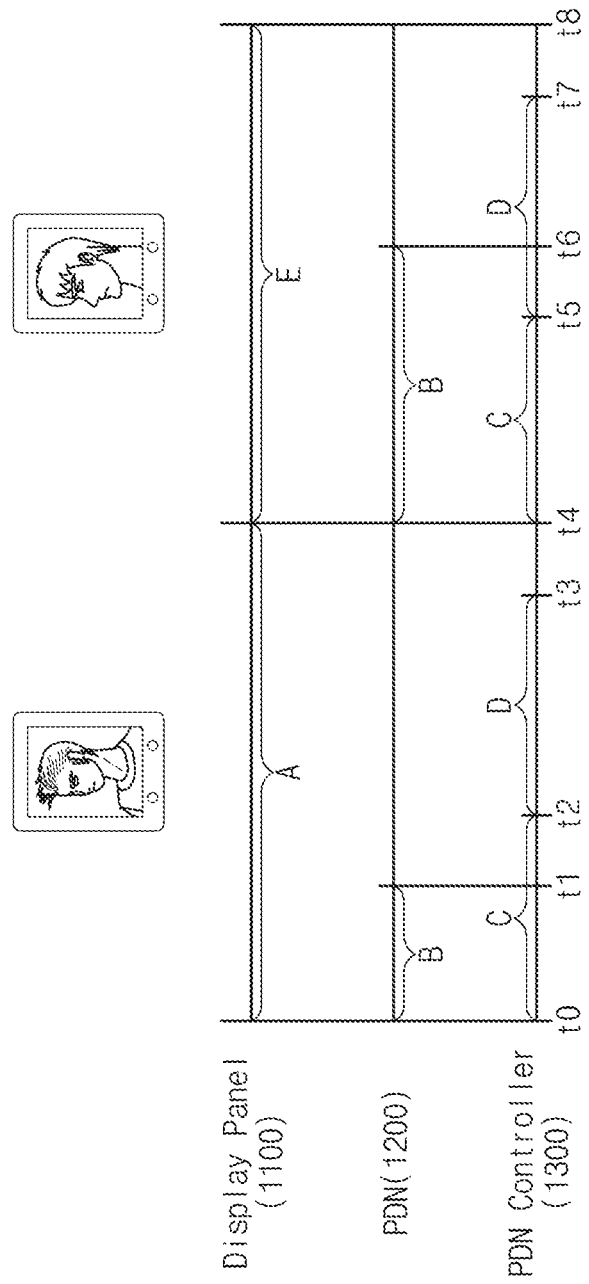
FIG. 3 is a conceptual diagram for explaining operation timings of the display device illustrated in FIG. 1.

FIG. 3 is a conceptual diagram for explaining operation timings of the display device illustrated in FIG. 1. The conceptual diagram of FIG. 3 will be explained with reference to FIGS. 1 and 2.

In a period of t0 to t4, the display panel 1100 displays frames included in a previous window. The time period A is defined as a period of t0 to t4. In other words, it is a time when the window determined by a previous process is currently being displayed.

In a period of t0 to t1, the PDN 1200 reconfigures the PDN 1200 for frames included in the previous window. A time period B is defined as a time taken for reconfiguring the PDN 1200. In other words, the time period B is a reconfiguration time of the PDN 1200 for the frames displayed in the time period A. Accordingly, the time period B is determined by a longer one between a supply voltage change time of the first and second converters 1210 and 1220 and a reconfiguration time of the switch network 1230. This corresponds to the execution time of operation S400 of FIG. 2.

In a period of t0 to t2, the PDN controller 1300 generates reconfiguration information for a next window. A time period C is defined as a period of t0 to t2. This corresponds to an execution time of the reconfiguration information generating operation S100 of FIG. 2. In a period of t2 to t3, the PDN controller 1300 determines whether to update a window size and re-execute the reconfiguration information generating operation S100. A time period D is defined as a period of t2 to t3. This corresponds to the execution time of the window size update and the operation S300 for determining whether to re-execute operation S100 of FIG. 2. In a period of t4 to t8, the above-described time periods A to D are repeated and accordingly a description thereabout will be omitted. However, in this case, the time period B may be longer than the time period C.

Figure 4:
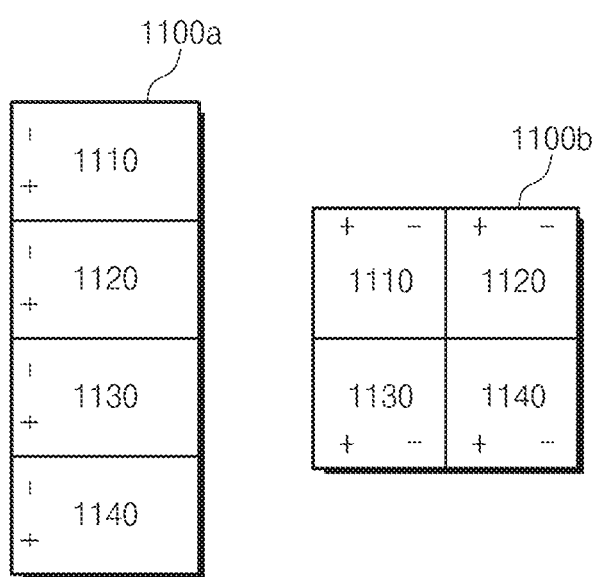
FIG. 4 is an exemplary drawing illustrating the display panel illustrated in FIG. 1.

FIG. 4 exemplarily illustrates the display panel illustrated in FIG. 1. Referring to FIG. 4, the display panel 1100 may be configured with various types of sub-panels 1110 to 1140. For example, the display panel 1100a may be configured with sub-panels 1110 to 1140 divided horizontally. Alternatively, the display panel 1100b may be configured with sub-panels 1110 to 1140 divided in a grid type. However, FIG. 4 is an exemplary configuration of the display panel 1100 and the configuration of the display panel 1100 is not limited thereto.

Figure 5:
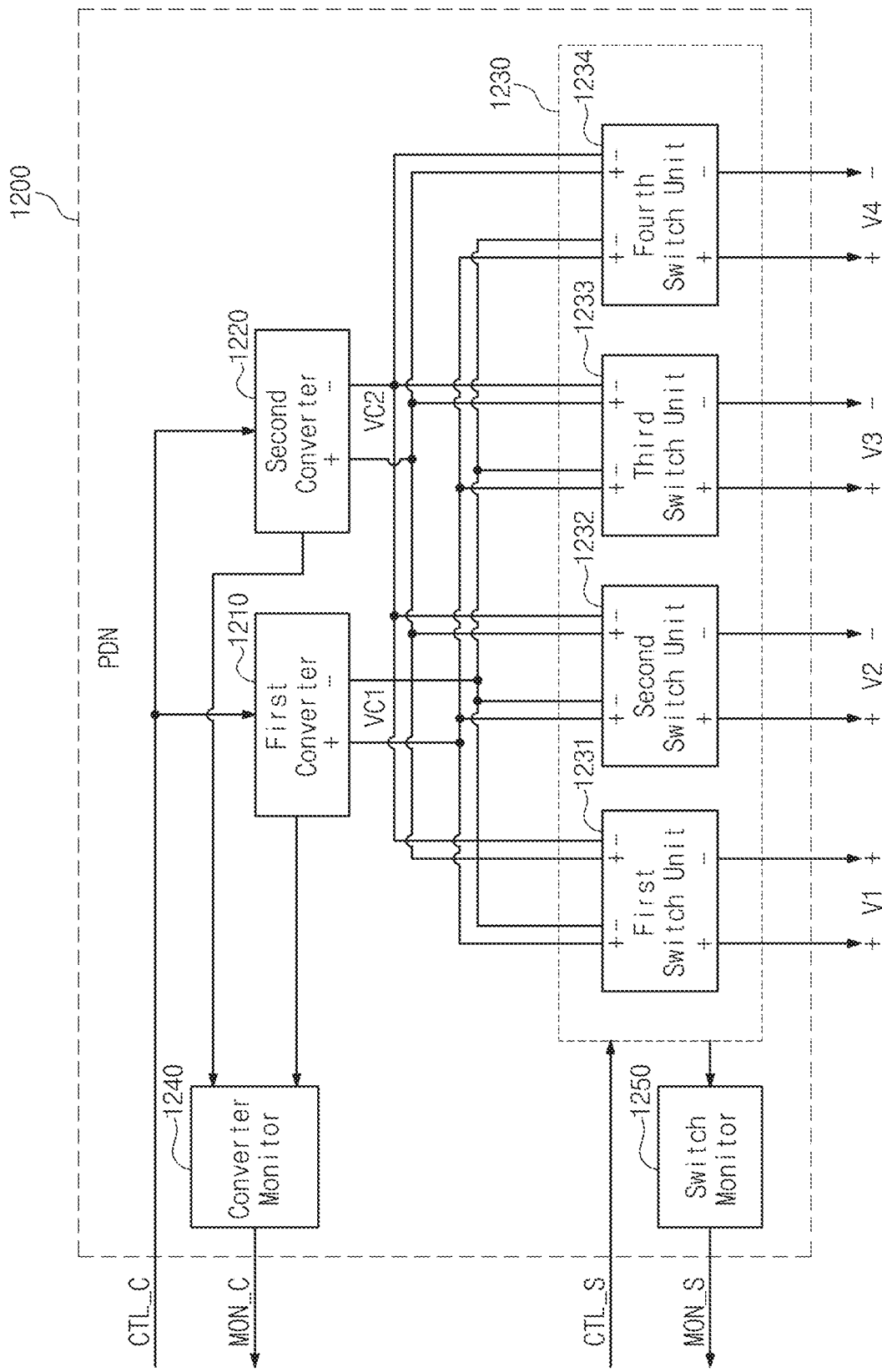
FIG. 5 is an exemplary block diagram of the power delivery network (PDN) illustrated in FIG. 1.

FIG. 5 is an exemplary block diagram of the PDN illustrated in FIG. 1. The configuration and operation of the PDN 1200 will be explained with reference to FIG. 1. Referring to FIG. 5, the PDN 1200 may include first and second converters 1210 and 1220, a switch network 1230, a converter monitor 1240, and a switch monitor 1250. The PDN 1200 is reconfigured under a control of the PDN controller 1300 to supply voltages to the display panel 1100. The first and second converters 1210 and 1220, the switch network 1230, the converter monitor 1240, and the switch monitor 1250 may be realized in hardware.

The first and second converters 1210 and 1220 are connected with first to fourth switch units 1231 to 1234. The first and second converters 1210 and 1220 receive a converter control signal CTL_C from the PDN controller 1300 to generate first and second voltages VC1 and VC2. The generated first and second voltages VC1 and VC2 are supplied to the first to fourth switch units 1231 to 1234. The first and second converters 1210 and 1220 provide converter state information to the converter monitor 1240. For example, the converter state information may include the generated voltage levels, supply current amounts, and allowable supply current amounts of the first and second converters 1210 and 1220, information about a connected switch unit among the first to fourth switch units 1231 to 1234, and whether a voltage is droopped. The converter state information may be provided to the converter monitor 1240 in real time. The PDN 1200 may include a voltage sensor, a current sensor, and the like for monitoring the converter state information and providing the monitored result to the converter monitor 1240.

The switch network 1230 may include the first to fourth switch units 1231 to 1234. The first to fourth switch units 1231 to 1234 are respectively connected to the plurality of sub-panels 1110 to 1140. The first to fourth switch units 1231 to 1234 are controlled by the switch control signal CTL_S generated by the PDN controller 1300. The first to fourth switch units 1231 to 1234 respectively provide one of the first and second voltages VC1 and VC2 to the plurality of sub-panels 1110 to 1140 according to the switch control signal CTL_S. When the number of the first and second converters 1210 and 1220 is smaller the number of the plurality of sub-panels 1110 to 1140, the first and second converters 1210 and 1220 may be simultaneously connected to the plurality of sub-panels 1110 to 1140. In other words, the supply voltages V1 to V4 may have an identical voltage level. For example, the number of the first and second converters 1231 and 1234 may be the same as the number of the plurality of sub-panels 1110 to 1140, and is not limited to that illustrated in FIG. 1. The configuration of the first switch unit 1231 will be explained with reference to FIG. 6. For example, the configurations of the second to fourth switch units 1232 to 1234 may be identical to that of the first switch unit 1231.

The switch network 1230 provides the switch state information to the switch monitor 1250. For example, the switch state information may include a current amount flowing through the first to fourth switch units 1231 to 1234, an allowable current amount, information about connected sub-panels, and an on or off operation time of each of the first to fourth switch units 1231 to 1234. The switch state information may be provided to the switch monitor 1250 in real time. The PDN 1200 may include a voltage sensor, a current sensor, and the like for monitoring the switch state information and providing the monitored result to the switch monitor 1250.

The converter monitor 1240 receives the converter state information from the first and second converters 1210 and 1220 to generate the converter monitoring signal MON_C. The converter monitor 1240 provides the generated converter monitoring signal MON_C to the PDN controller 1300. The switch monitor 1250 receives the switch state information from the switch network 1230 to generate the switch monitoring signal MON_S. The switch monitor 1250 provides the generated switch monitoring signal MON_S to the PDN controller 1300. For example, the converter monitor 1240 and the switch monitor 1250 may include a register, a memory, and the like for storing the received converter and switch state information and the generated converter and switch monitoring signals MON_C and MON_S.

Figure 6:
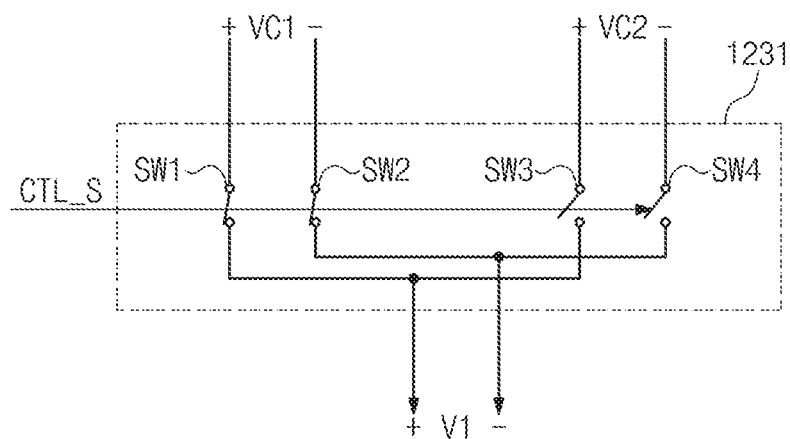
FIG. 6 is an exemplary circuit diagram of the first switch unit illustrated in FIG. 5.

FIG. 6 is an exemplary circuit diagram of the first switch unit illustrated in FIG. 5. Referring to FIG. 6, the first switch unit 1231 may include first to fourth switch circuits SW1 to SW4. The first and second switch circuits SW1 and SW2 are turned on or off at an identical timing by the switch control signal CTL_S. The third and fourth switch circuits SW3 and SW4 are turned on or off at an identical timing by the switch control signal CTL_S. The first and second switch circuits SW1 and SW2, and the third and fourth switch circuits SW3 and SW4 are turned on or off at complementary timings. In other words, when the third and fourth circuits SW3 and SW4 are turned on, the first and second switch circuits SW1 and SW2 are turned off. Due to such an operation, the first switch unit 1231 provides the first voltage VC1 or the second voltage VC2 to the plurality of sub-panels 1110 to 1140.

FIG. 6 illustrates an exemplary configuration of the first switch unit 1231 and the configuration of the first switch unit 1231 is not limited thereto. In other words, the first switch unit 1231 may be configured with a single block playing a role as shown in FIG. 6. For example, the first switch unit 1231 may be configured with a multiplexer. As described above, the configurations of the second to fourth switch units 1232 to 1234 may be identical to that of the first switch unit 1231.

Figure 7:
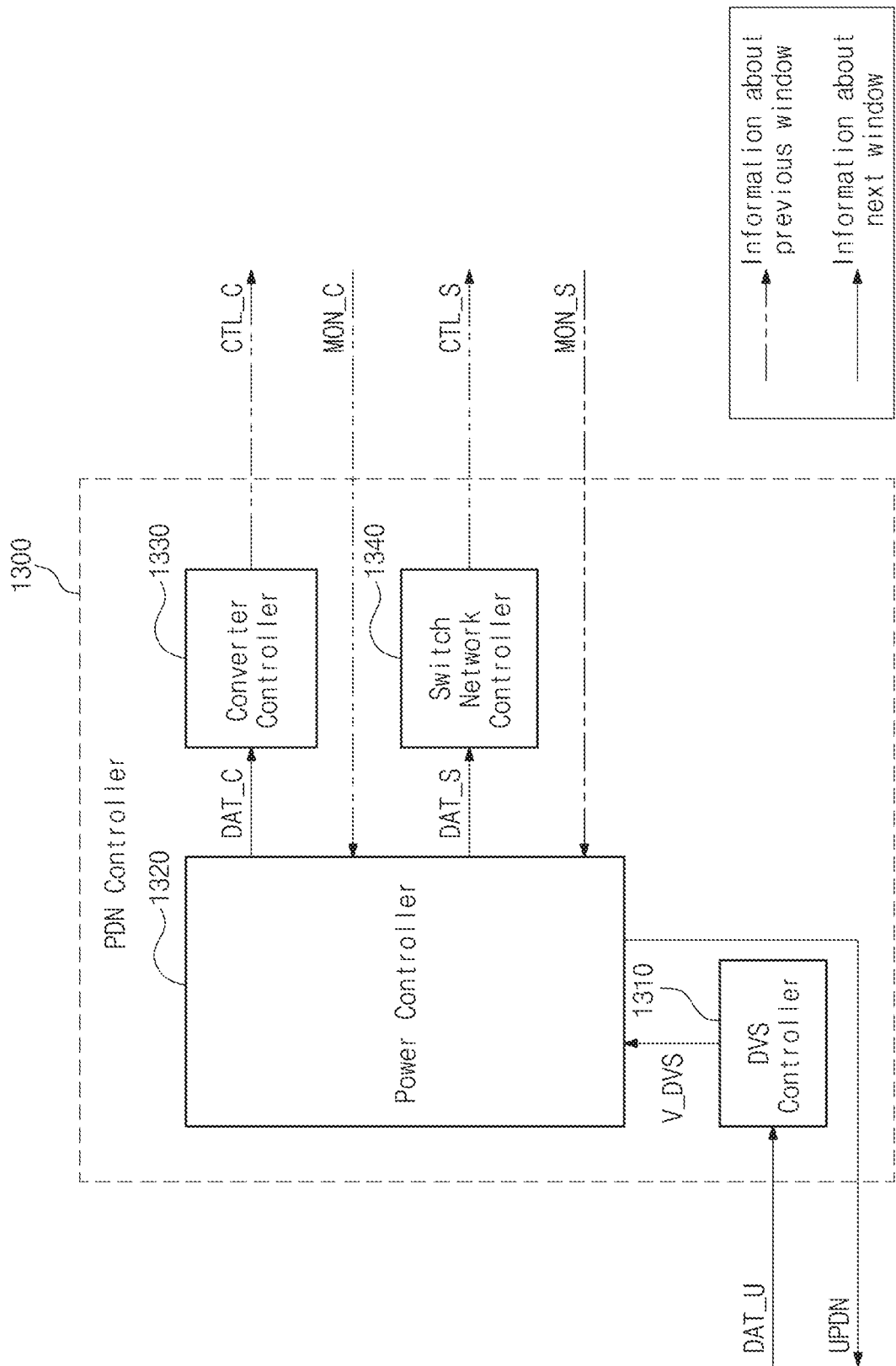
FIG. 7 is an exemplary block diagram of the PDN controller illustrated in FIG. 1.

FIG. 7 is an exemplary block diagram of the PDN controller illustrated in FIG. 1. FIG. 7 will be explained with reference to FIG. 1. Referring to FIG. 7, the PDN controller 1300 may include a DVS controller 1310, a power controller 1320, a converter controller 1330, and a switch network controller 1340. A dotted line means information about a frame included in a previous window. A solid line means information about a frame included in a next window. The PDN controller 1300 controls the PDN 1200 and the image controller 1400. The above-described DVS controller 1310, power controller 1320, converter controller 1330, and switch network controller 1340 may be realized in hardware.

The DVS controller 1310 receives integrated image data DAT_U from the image controller 1400 to generate DVS voltage information V_DVS. The DVS voltage information V_DVS is determined by highest voltage values requested by pixels, which form each of the plurality of sub-panels 1110 to 1140, for frames included in the next window. In other words, the DVS voltage information V_DVS includes information about voltage levels of supply voltages V1 to V4 to be respectively supplied to the plurality of sub-panels 1110 to 1140. The DVS controller 1310 provides the generated DVS voltage information V_DVS to the power controller 1320.

The power controller 1320 is connected to the PDN 1200, the DVS controller 1310, the converter controller 1330, the switch network controller 1340, and the image controller 1400. The power controller 1320 receives, from the PDN 1200, the monitoring signals MON_C and MON_S of the first and second converters 1210 and 1220 and the switch network 1230 for a previous window. In addition, the power controller 1320 receives, from the DVS controller 1310, the DVS voltage information V_DVS for a next window.

The power controller 1320 generates converter voltage information DAT_C, switch connection information DAT_S, and a size adjusting signal UPDN for a next window on the basis of the received information MON_C, MON_S, and V_DVS. The power controller 1320 respectively provides the generated converter voltage information DAT_C and switch connection information DAT_S to the converter controller 1330 and the switch network controller 1340. The power controller 1320 provides the generated size adjusting signal UPDN to the image controller 1400 to adjust the window size to be processed by the image controller 1400. An operation of the power controller 1320 will be explained with reference to FIGS. 8 and 9.

The converter controller 1330 receives the converter voltage information DAT_C from the power controller 1320 to generate the converter control signal CTL_C. For example, the converter control signal CTL_C may be a digital code. The converter control signal CTL_C adjusts levels of the first and second voltages VC1 and VC2 of the first and second converters 1210 and 1220. The converter controller 1330 provides the generated converter control signal CTL_C to the first and second converters 1210 and 1220.

The switch network controller 1340 receives the switch connection information DAT_S from the power controller 1320 to generate the switch control signal CTL_S. For example, the switch control signal CTL_S may be a digital code. The switch control signal CTL_S controls the first to fourth switch units 1231 to 1234 configuring the switch network 1230. The switch network controller 1340 provides the generated switch control signal CTL_S to the switch network 1230.

Figure 8:
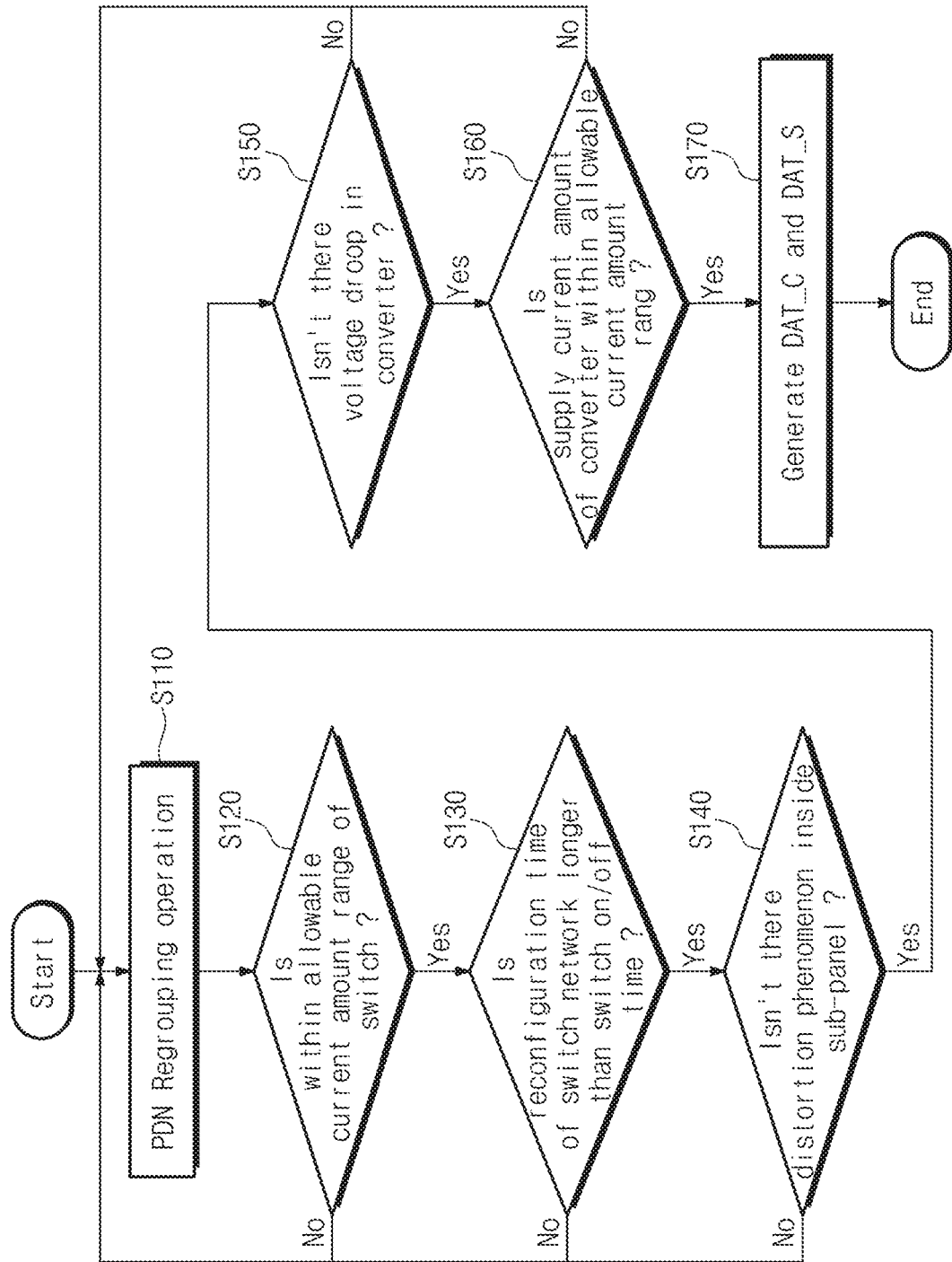
FIG. 8 is a detailed flowchart illustrating operation S100 illustrated in FIG. 2.

FIG. 8 is a detailed flowchart illustrating operation S100 illustrated in FIG. 2. The flowchart of FIG. 8 will be explained with reference to FIGS. 1, 5, and 7. Referring to FIG. 8, the power controller 1320 may generate the converter voltage information DAT_C and the switch connection information DAT_S.

In operation S110, the power controller 1320 regroups the first and second converters 1210 and 1220 and the plurality of sub-panels 1110 to 1140 configuring the PDN 1200. Firstly, the power controller 1320 receives, from the DVS controller 1310, the DVS voltage information V_DVS. The DVS voltage information V_DVS includes voltage information to be supplied to the plurality of the sub-panels 1110 to 1140. The power controller 1320 determines the first and second voltages VC1 and VC2 of the first and second converters 1210 and 1220 on the basis of voltage information of the DVS voltage information V_DVS. According to the embodiment of FIG. 1, the PDN 1200 includes the first and second converters 1210 and 1220. Accordingly, the plurality of sub-panels 1110 to 1140 are divided into two groups. This is because each of the first and second converters 1210 and 1220 may supply only one voltage. The number of combinations for division into two groups may be in plurality.

According to the combinations of the grouped sub-panels 1110 to 1140, the levels of the first and second voltages VC1 and VC2 may be differed. For example, let us assume that voltages requested from the plurality of sub-panels 1110 to 1140 are respectively 10 V, 13 V, 12 V, and 8 V. The first group may be configured with the sub-panels 1110 and 1140 requesting 10 V and 8 V, and the second group may be configured with the sub-panels 1120 and 1130 requesting 13 V and 12 V. In this case, the first converter 1210 may supply 10 V for satisfying all the requested voltages of the first group and the second converter 1220 may supply 13 V for satisfying all the requested voltages of the second group. This is exemplary, and various combinations may occur by a grouping method.

Accordingly, group combinations of the sub-panels 1110 to 1140 and a plurality of combinations through which the PDN 1200 may be reconfigured by the levels of the first and second voltages VC1 and VC2 are generated. Then, the power controller 1320 sequentially simulates a plurality of combinations in order to pass through operations S110 to S160. In subsequent operations S110 to S160, determination is performed on the basis of the combination determined in operation S110.

As described above, the first and second converters 1210 and 1220 may be two or more in number, and in this case, the grouped combinations may be increased to the number of the first and second converters 1210 and 1220. For example, when the number of the converters is three, the plurality of sub-panels 1110 to 1140 are grouped into three groups.

In operation S120, the power controller 1320 determines whether a driving current amount of a switch circuit is within an allowable current amount range of the switch circuit, when the PDN 1200 is configured with the combination of the groups determined in operation S110. The above-described switch circuit may be first to fourth switch circuits SW1 to SW4 of each of the first to fourth switch units 1231 to 1234 illustrated in FIG. 5. The power controller 1320 may receive the switch monitoring signal MON_S from the switch monitor 1250 to predict the characteristic of the switch circuit. The power controller 1320 performs the determination in operation S120 on the basis of the received switch monitoring signal MON_S. When the driving current amount exceeds the allowable current amount of the switch circuit (No direction), the power controller 1320 performs operation S110 again. On the other hand, when the driving current amount is within the allowable current amount of the switch circuit (Yes direction), the process of the power controller 1320 proceeds to operation S130.

In operation S130, the power controller 1320 determines whether a time to reconfigure the switch network 1230 is shorter than an on/off time of each switch circuit. The above-described switch circuit may be first to fourth switch circuits SW1 to SW4 of the first to fourth switch units 1231 to 1234 illustrated in FIG. 5. As described above, the power controller 1320 may predict a reconfiguration time of the switch network 1230 and the on/off characteristic of the switch circuit on the basis of the switch monitoring signal MON_S. When the reconfiguration time of the switch network 1230 is shorter than the on/off time of the switch circuit (No direction), the power controller 1320 performs operation S110 again. On the other hand, when the reconfiguration time of the switch network 1230 is longer than the on/off time of the switch circuit (Yes direction), the process of the power controller 1320 proceeds to operation S140.

In operation S140, the power controller 1320 determines whether there is a distortion phenomenon inside each of the plurality of sub-panels 1110 to 1140. The distortion phenomenon occurs when a voltage supplied to any one part inside the display panel 1100 is lowered than an operation voltage by an IR drop. The power controller 1320 may monitor, from the switch monitoring signal MON_S, an actual current amount and actual supply voltages V1 to V4 provided to the plurality of sub-panels 1110 to 1140 and may determine whether there is a distortion phenomenon. When a distortion phenomenon occurs in at least one of the plurality of sub-panels (No direction), the power controller 1320 performs operation S110 again. On the other hand, when there is not a distortion phenomenon inside the plurality of sub-panels 1110 to 1140 (Yes direction), the process of the power controller 1320 proceeds to operation S150.

In operation S150, the power controller 1320 determines whether there are voltage droops in the first and second converters 1210 and 1220. A voltage droop indicates a phenomenon that an output voltage level drops by a loss, which occurs when an electronic device drives a load, inside the electronic device. The power controller 1320 may receive information about supply voltages and current amounts of the first and second converters 1210 and 1220 from the converter monitoring signal MON_C to determine whether there are voltage droops. When there is a voltage droop in at least one of the first and second converters 1210 and 1220 (No direction), the power controller 1320 performs operation S110 again. On the other hand, when there is not a voltage droop in the first and second converters 1210 and 1220 (Yes direction), the process of the power controller 1320 proceeds to operation S160.

In operation S160, the power controller 1320 determines whether supply current amounts of the first and second converters 1210 and 1220 are within an allowable current amount. The power controller 1320 receives the supply voltages of the first and second converters 1210 and 1220 and information about the connected sub-panels 1110 to 1140 from the converter monitoring signal MON_C and the switch monitoring signal MON_S. On the basis of the received information, the power controller 1320 determines whether a supply current amount of at least one of the first and second converters 1210 and 1220 is within the allowable current amount of the first and second converters 1210 and 1220. When the supply current amount of at least one of the first and second converters 1210 and 1220 exceeds the allowable current amount (No direction), the power controller 1320 performs operation S110 again. On the other hand, when the supply current amount of at least one of the first and second converters 1210 and 1220 is within the allowable current amount range (Yes direction), the process of the power controller 1320 proceeds to operation S170.

In operation S170, the power controller 1320 generates the converter voltage information DAT_C and the switch connection information DAT_S. The power controller 1320 generates the levels of the first and second voltages VC1 and VC2 and connection information about the switch network 1230 on the basis of the grouped combination of the PDN 1200 passing through the above-described operations S120 to S170.

As described above in relation to FIG. 2, when the execution time of operations S110 to S170 exceeds the first reference time, the power controller 1320 provides the generated converter voltage information DAT_C and switch connection information DAT_S to the converter controller 1330 and the switch network controller 1340. On the other hand, when the execution time is shorter than the first reference time, the power controller 1320 executes operation S300.

In FIG. 8, operations S120 to S160 are illustrated as performed sequentially. However, this is exemplary, and the power controller 1320 may determine the foregoing operations S120 to S160 regardless of the sequence.

Figure 9:
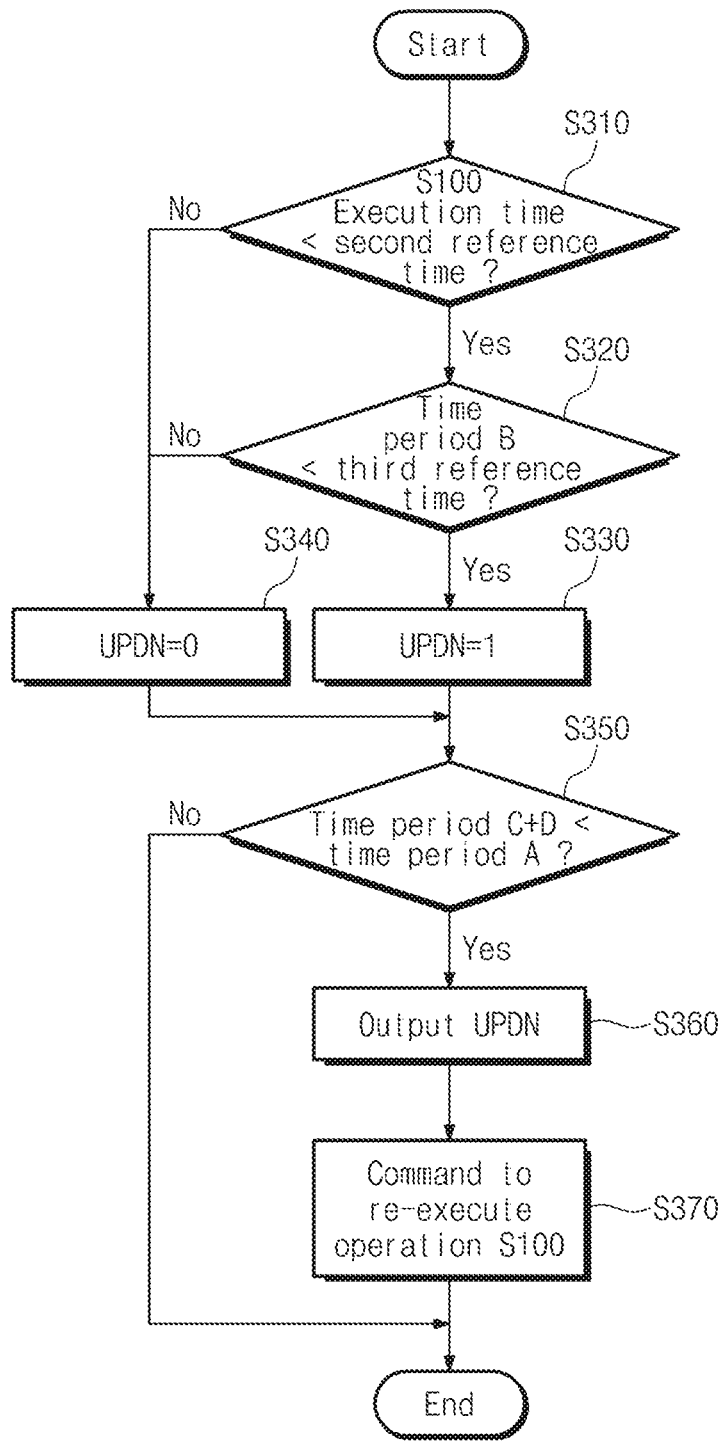
FIG. 9 is a detailed flowchart illustrating operation S300 illustrated in FIG. 2.

FIG. 9 is a detailed flowchart showing operation S300 illustrated in FIG. 2. The flowchart of FIG. 9 will be explained with reference to FIGS. 1, 5, and 7. Referring to FIG. 9, the power controller 1320 may generate the size adjusting signal UPDN.

The reason for generating the size adjusting signal UPDN is as the following. In operation S100, the power controller 1320 generates reconfiguration information for a next window with respect to a pre-determined window size. However, according to image data of frames included in the window, a pre-determined window size may not be suitable for executing operations S100 to S170. In this case, the power controller 1320 generates the size adjusting signal UPDN to adjust the window size. For example, it is assumed that there is little image change in frames. In this case, a data amount to be processed by the power controller 1320 is reduced. Accordingly, the power controller 1320 may increase the window size to increase the number of frames to be processed. On the other hand, it is assumed that there are much image changes in frames. In this case, a data amount to be processed by the power controller 1320 is increased. Accordingly, the power controller 1320 may increase the window size to reduce the number of frames to be processed.

In operation S310, the power controller 1320 determines whether the execution time of operation S100 is shorter than a second reference time. For example, the second reference time may be the execution time of operation S100 for a previous window. In other words, it may be determined whether the window size is proper on the basis of a previous execution time of operation S100. However, this is exemplary, and the second reference time is not limited thereto. Alternatively, the second reference time may be determined at the time of booting the display device. When the execution time of operation S100 is longer than the second reference time (No direction), the power controller 1320 determines the size adjusting signal UPDN to be logic '0' (operation S340). On the other hand, when the execution time of operation S100 is shorter than the second reference time (Yes direction), the process of the PDN controller 1320 proceeds to operation S320.

In operation S320, the power controller 1320 determines whether the time period B is shorter than a third reference time. As described above, the time period B is a reconfiguration time of the PDN 1200. For example, the third reference time may be the reconfiguration time of the PDN 1200 for a previous window. Alternatively, the third reference time may be determined at the time of booting the display device. As another example, the third reference time may be determined by an external control signal. When the time period B is longer than the third reference time (No direction), the power controller 1320 determines the size adjusting signal UPDN to be logic '0' (operation S340). On the other hand, when the time period B is shorter than the third reference time (Yes direction), the power controller 1320 determines the size adjusting signal UPDN to be logic '1' (operation S330).

Through operations S310 and S320, the power controller 1320 may determine whether a current window size is suitable for data processing. In FIG. 9, operations S310 and S320 are illustrated as performed sequentially. However, this is exemplary, and the power controller 1320 may determine the foregoing operations S310 and S320 regardless of the sequence.

In operation S350, the power controller 1320 determines whether a sum of the time period C and the time period D is shorter than the time period A. When the size adjusting signal UPDN is determined through operations S310 to S340, the power controller 1320 determines whether to re-execute operation S100 on the basis of the execution time of operations S100 and S300. As described above, the time period C is the execution time of operation S100, and the time period D is the execution time of operation S300. In addition, the time period A is a time when a window determined by a previous process is currently being displayed. The reason for determining this is because in case of passing the time period A during execution of operation S300, there is no need to re-execute operation S100 because next window frames are to be displayed.

When the sum of the time period C and the time period D is longer than the time period A (No direction), the process of the power controller 1320 is terminated. Then, the power controller 1320 provides the converter voltage information DAT_C and the switch connection information DAT_S determined in operation S100 to the converter controller 1330 and the switch network controller 1340. On the other hand, when the sum of the time period C and the time period D is shorter than the time period A (Yes direction), the process of the power controller 1320 proceeds to operation S360.

In operation S360, the power controller 1320 outputs the determined size adjusting signal UPDN. The power controller 1320 provides the size adjusting signal UPDN to the image controller 1400.

In operation S370, the power controller 1320 commands to re-execute operation S100. However, when the power controller 1320 passes through the time period A during re-execution of operation S100 according to the re-execution command, the process of operation S100 is terminated. This is because there is no need to re-execute operation S100 any more as described above.

For example, the power controller 1320 may determine, in real time, whether to pass through the time period A during execution of operations S100 to S300. In other words, the power controller 1320 does not determine whether to perform the process only by depending on the timing of the above-described flowchart, but also determines in real time. The power controller 1320 may stop the process when there is no need to proceed the process any further and may reconfigure the PDN 1200 by the result determined before stopping.

Figure 10:
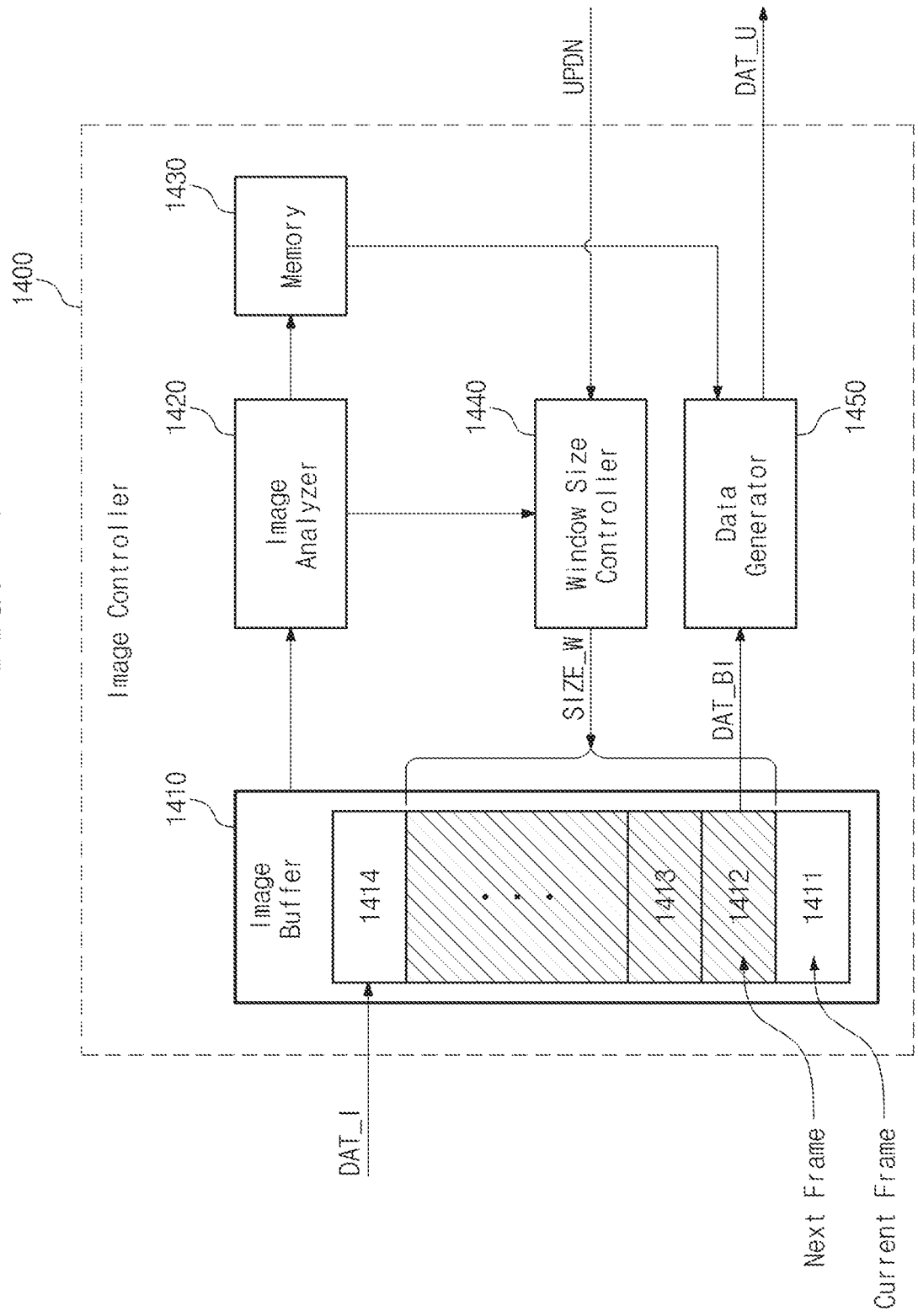
FIG. 10 is an exemplary block diagram of the image controller illustrated in FIG. 1.

FIG. 10 is an exemplary block diagram of the image controller illustrated in FIG. 1. FIG. 10 will be explained with reference to FIG. 1. Referring to FIG. 10, the image controller 1400 may include an image buffer 1410, an image analyzer 1420, a memory 1430, a window size controller 1440, and a date generator 1450. The image controller 1400 integrates frames determined by a window size SIZE_W into one image to generate integrated image data DAT_U. The image buffer 1410, the image analyzer 1420, the memory 1430, the window size controller 1440, and the data generator 1450 may be realized in hardware.

The image buffer 1410 may include a plurality of buffers 1411 to 1414. The image buffer 1410 may receive frame image data DAT_I to store. Frame image data DAT_I of a frame that is currently being displayed is stored in a last buffer 1411. Frame image data DAT_I of a next frame is stored in a next buffer 1412. Latest frame image data DAT_I is stored in a first buffer 1414. In other words, the frame image data DAT_I is sequentially stored in an input order. The image buffer 1410 provides buffer data DAT_BI to the data generator 1450.

The image analyzer 1420 receives, from the image buffer 1410, the frame image data DAT_I stored in the buffers 1411 to 1414 and analyzes the received data. For example, the image analyzer 1420 analyzes whether there is an identical part between the frame image data DAT_I of consecutive frames. Alternatively, the image analyzer 1420 analyzes whether there is a part that may be sensitive to an image distortion, when the frame image data DAT_I for each frame is displayed. This is because there is a case where an image distortion degree looks differently according to image types of frames. The image analyzer 1420 provides the analyzed result to the memory 1430 and the window size controller 1440. The reason for storing the analyzed result in the memory 1430 is for allowing the data generator 1450 not to duplicate the image analyzing job.

The window size controller 1440 receives the size adjusting signal UPDN and the analyzed information from the PDN controller 1300 and the image analyzer 1420 to adjust the window size SIZE_W, and provides the window size SIZE_W to the image buffer 1410. As describe above, the window size SIZE_W is defined as the number of frames used for generating reconfiguration information.

The data generator 1450 receives the buffer data DAT_BI from the image buffer 1410. The buffer data DAT_BI is frame image data DAT_I for frames in number determined by the window size SIZE_W. In addition, the data generator 1450 receives the image analysis information from the memory 1430. The data generator 1450 integrates the received buffer data DAT_BI into one image to generate integrated image data DAT_U. The data generator 1450 omits overlapping jobs with the image analyzer 1420 using the analysis information. The generated integrated image data DAT_U is not displayed. The integrated image data DAT_U is used for generating the reconfiguration information.

Figure 11:
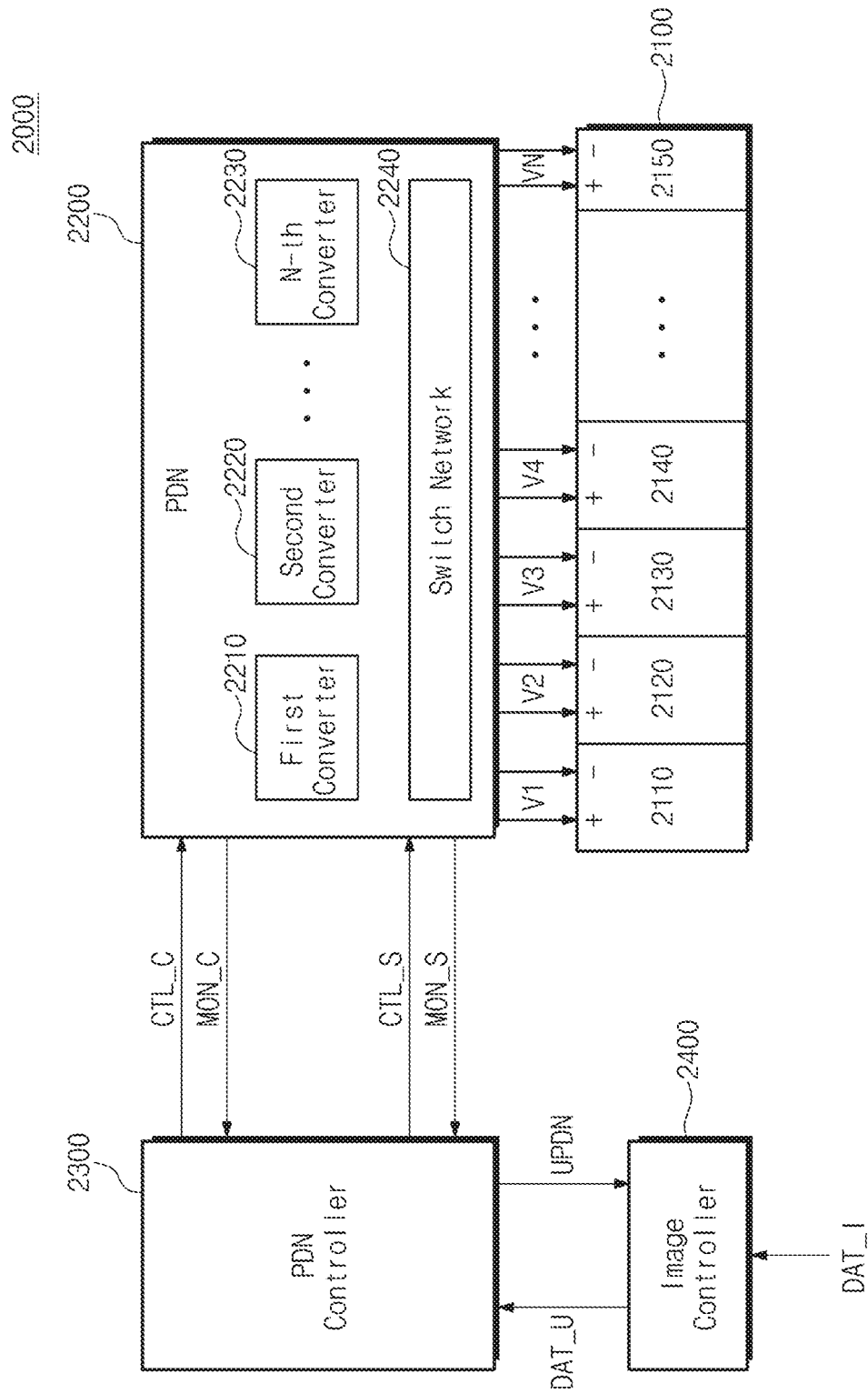
FIGS. 11 and 12 are block diagrams illustrating a display device according to other embodiments of the present invention.
Figure 12:
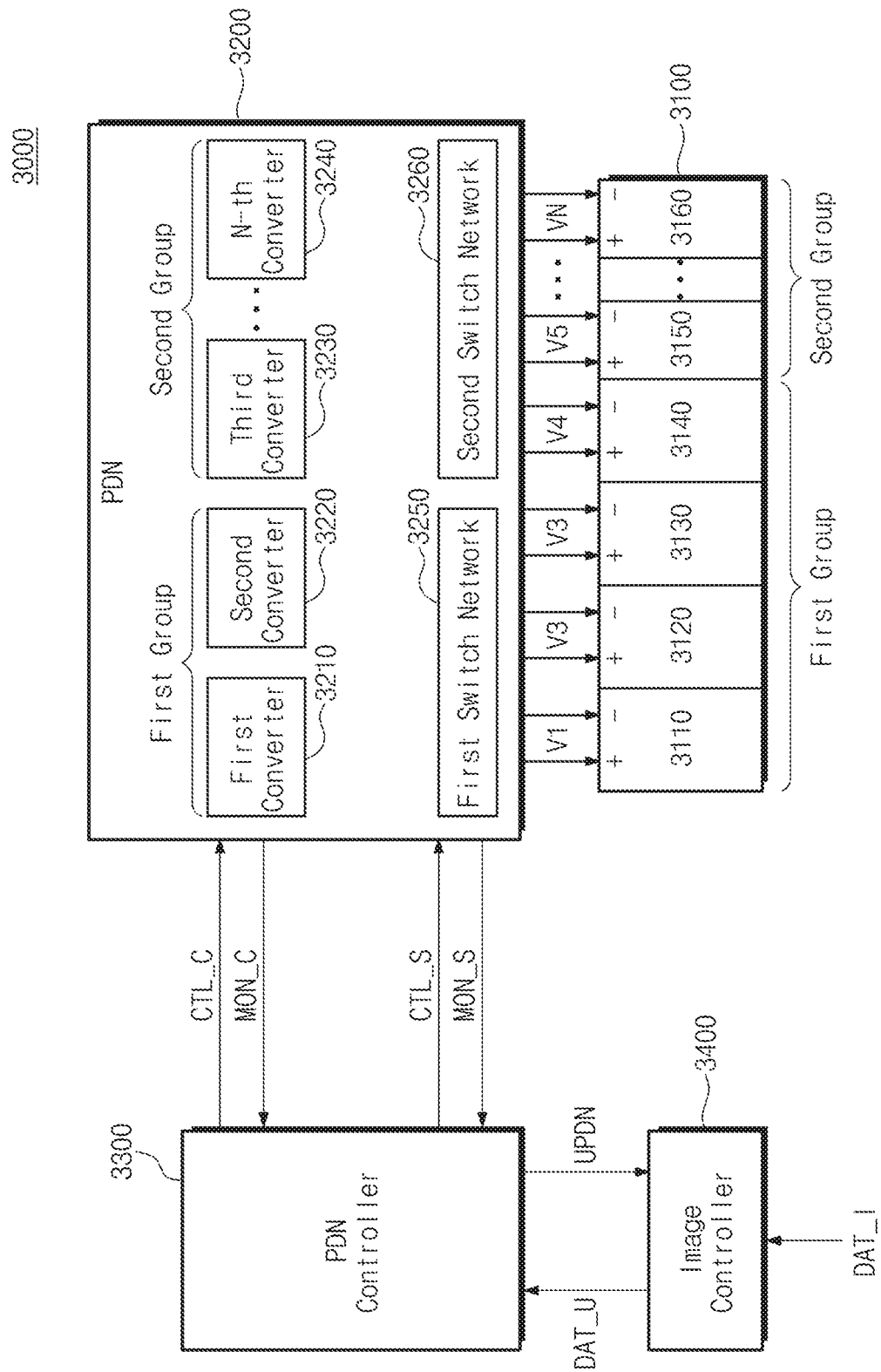

FIGS. 11 and 12 are block diagrams illustrating a display device according to other embodiments of the present invention.

Referring to FIG. 11, a display device 2000 may include a display panel 2100, a PDN 2200, a PDN controller 2300, and an image controller 2400. The display panel 2100 of FIG. 11 may include a plurality of sub-panels 2110 to 2150. In addition, the PDN 2200 may include first to N-th converters 2210 to 2230. In other words, as described above in relation to FIG. 1, the display device 2000 may be extended to include a plurality of sub-panels 2110 to 2150 and the plurality of converters 2210 to 2230. Except for the above-described, the configuration and operation of the display device 2000 of FIG. 11 are identical to those of the display device 1000 of FIG. 1. Accordingly, a description thereabout will be omitted.

Referring to FIG. 12, a display device 3000 may include a display panel 3100, a PDN 3200, a PDN controller 3300, and an image controller 3400. The sub-panels 3110 to 3160 of FIG. 12 may be divided into first and second groups. The PDN 3200 may include first to N-th converters 3210 and 3240 and first and second switch networks 3250 and 3260. The first to N-th converters 3210 to 3240 may be divided into first and second groups. Except for the above-described, the configuration and operation of the display device 3000 of FIG. 12 are identical to those of the display device 2000 of FIG. 11. Accordingly, a description thereabout will be omitted.

The first switch network 3250 connects the first and second converters 3210 and 3220 belonging to the first group with the plurality of sub-panels 3110 to 3140 belonging to the first group. The second switch network 3260 connects the third to N-th converters 3230 to 3240 belonging to the second group with the plurality of sub-panels 3150 to 3160 belonging to the second group. In other words, the first and second converters 3210 and 3220 belonging to the first group supply power only to the sub-panels 3110 to 3140 belonging to the first group. In addition, the third to N-th converters 3230 to 3240 belonging to the second group supply power only to the sub-panels 3150 to 3160 belonging to the second group. Here, the number of the converters 3210 to 3240 belonging to the first and second groups and the number of the plurality of sob-panels 3110 to 3160 are not limited to those illustrated in FIG. 12. In addition, the number of groups is not limited to that illustrated in FIG. 12 and may be two or more.

The display device 3000 of FIG. 12 may divide the switch network into the first and second switch networks 3250 and 3260 to simplify connection of the switch network. In addition, reconfiguration combination of the switch network may be reduced to decrease data throughputs of operations S100 to S400. Consequently, the data processing speed by the PDN controller 1300 may be improved.

As described above, exemplary embodiments have been disclosed in this specification and the accompanying drawings. Although specific terms are used herein, they are just used for describing the present disclosure, but do not limit the meanings and the scope of the present invention disclosed in the claims. Accordingly, those skilled in the art will appreciate that various modifications and other equivalent embodiments can be derived from the exemplary embodiments of the present disclosure. Therefore, the scope of true technical protection of the present disclosure should be defined by the technical idea of the appended claims.

The invention claimed is:

1. A power management method using a display device, which comprises a display panel comprising a plurality of sub-panels, a power delivery network (PDN) comprising a switch network and a plurality of DC-DC converters, an image controller, and a PDN controller, the method comprising:
   a reconfiguration information generating operation for generating, by the PDN controller, reconfiguration information of the PDN for frames that configure a next window on a basis of an existing window size and existing state information about the PDN;

an update and whether to re-execute determining operation for determining, by the PDN controller, whether to update the window size and whether to re-execute the reconfiguration information generating operation on a basis of the generated reconfiguration information;

an updating and re-executing operation for updating, by the image controller and the PDN controller, the window size and re-executing the reconfiguration information generating operation according to a result of the update and whether to re-execute determining operation;

and an operation for reconfiguring, by the PDN, the PDN on a basis of the generated reconfiguration information.

2. The power management method of claim 1, wherein the switch network comprises a plurality of switches configured to respectively connect the plurality of DC-DC converters with the plurality of sub-panels.

3. The power management method of claim 2, wherein the reconfiguration information generating operation comprises:
   a regrouping operation for changing supply voltages of the plurality of DC-DC converters and regrouping the plurality of DC-DC converters and the plurality of sub-panels;
   a switch current amount determining operation for predicting a current amount to flow through each of the plurality of switches and determining whether the current amounts are within an allowable current amount range of the switches;
   a switch reconfiguration time determining operation for predicting a reconfiguration time of the switch network and determining whether the reconfiguration time is longer than a turn-on or turn-off time of each of the plurality of switches;
   a distortion determining operation for determining whether there is a distortion phenomenon in the plurality of sub-panels;
   a droop determining operation for determining whether there is a voltage droop in each of the plurality of DC-DC converters;
   a converter current amount determining operation for predicting a supply current amount of each of the plurality of DC-DC converters and determining whether the supply current amounts are within an allowable current amount range of the DC-DC converters; and
   an information generating operation for generating reconfiguration information about the switch network and information of supply voltage and supply current of the plurality of DC-DC converters determined by the regrouping operation, the switch current amount determining operation, the switch reconfiguring time determining operation, the distortion determining operation, the droop determining operation, and the converter current amount determining operation,
   wherein when at least one of the regrouping operation, the switch current amount determining operation, the switch reconfiguring time determining operation, the distortion determining operation, the droop determining operation, and the converter current amount determining operation is not passed through, re-execution is performed from the regrouping operation.

4. The power management method of claim 1, wherein the update and whether to re-execute determining operation and an updating and re-executing operation are not executed when an execution time of the reconfiguration information generating operation exceeds a reference time,
   wherein the reference time is a half of a time when frames comprised in an existing window are executed by the display panel.

5. The power management method of claim 1, wherein the update and whether to re-execute determining operation comprises:
   a processing time determining operation for determining whether an execution time of the reconfiguration information generating operation is shorter than a first reference time;
   a reconfiguration time determining operation for determining whether a reconfiguration time of the PDN is shorter than a second reference time;
   a determining operation for determining a size adjusting signal according to results of the processing time determining operation and the reconfiguration time determining operation;
   a whether to update determining operation for determining whether an execution time of the reconfiguration information generating operation and the update and the whether to re-execute determining operation is shorter than a time that frames comprised in an existing window are executed by the display panel; and
   an operation for providing the determined size adjusting signal to the image controller according to the result of the whether to update determining operation,
   wherein the reconfiguration time of the PDN is a longer one between a reconfiguration time of the switch network and a supply voltage change time of the plurality of DC-DC converters.

6. The power management method of claim 5, wherein the first reference time is an execution time of the reconfiguration information generating operation for the existing window.

7. The power management method of claim 5, wherein the second reference time is a reconfiguration time of the PDN for the existing window.

8. The power management method of claim 1, wherein the updating and re-executing operation is stopped when a time that frames comprised in an existing window are executed by the display panel has passed during execution of the updating and re-executing operation.

9. The power management method of claim 1, wherein the display panel is an OLED display panel.

* * * * *